(12) United States Patent (10) Patent No.: US 7,773,819 B2
Hiraga et al. (45) Date of Patent: Aug. 10, 2010

(54) IMAGE PROCESSING APPARATUS

(75) Inventors: Masaki Hiraga, Tokyo (JP); Kensuke Habuka, Tokyo (JP)

(73) Assignee: Morpho, Inc., Tokyo (JP)

( * ) Notice: Subject to any disclaimer, the term of this patent is extended or adjusted under 35 U.S.C. 154(b) by 834 days.

(21) Appl. No.: 11/710,016

(22) Filed: Feb. 23, 2007

(65) Prior Publication Data

US 2007/0222864 A1 Sep. 27, 2007

(30) Foreign Application Priority Data

Feb. 24, 2006 (JP) ............................. 2006-048581

(51) Int. Cl.
*G06K 9/36* (2006.01)
(52) U.S. Cl. .................... 382/236; 348/208.4
(58) Field of Classification Search ................ 382/236; 348/208.4
See application file for complete search history.

(56) References Cited

U.S. PATENT DOCUMENTS 5,592,226 A * 1/1997 Lee et al. ............... 375/240.14
6,400,846 B1 * 6/2002 Lin et al. ................. 382/199
6,738,424 B1 * 5/2004 Allmen et al. ......... 375/240.08
2003/0053663 A1 * 3/2003 Chen et al. ............... 382/117

FOREIGN PATENT DOCUMENTS

| JP | 06-153146 | 5/1994 |
| JP | 06-311502 | 11/1994 |
| JP | 09-73540 | 3/1997 |
| JP | 09-98424 | 4/1997 |
| JP | 10-341445 | 12/1998 |
| JP | 11-506576 | 6/1999 |
| JP | 2003-78807 | 3/2003 |

* cited by examiner

*Primary Examiner*—Vikkram Bali
*Assistant Examiner*—Eueng-Nan Yeh
(74) *Attorney, Agent, or Firm*—Muramatsu & Associates

(57) ABSTRACT

Multi-resolution images of a reference image and a target image are generated. Then, whole-range matching is performed on an image of a lower resolution to detect a two-dimensional displacement between the images. Block matching is performed on an image of a higher resolution to detect a displacement at each feature point. The accuracy of motion data is increased by correcting the motion data with an image of a higher resolution by using the previously calculated motion data of the lowest resolution through higher resolutions as an initial value.

4 Claims, 14 Drawing Sheets

RESOLUTION LEVEL 0

RESOLUTION LEVEL 1

RESOLUTION LEVEL 2

RESOLUTION LEVEL 3

FIRST IMAGE

SECOND IMAGE

CORRECTED FRAME → SHOT FRAME

IMAGE PROCESSING APPARATUS

BACKGROUND OF THE INVENTION

1. Field of the Invention

The present invention relates to a technology that allows shooting a high quality still and/or moving picture. In particular, it is an object of the present invention to provide a computer image processing apparatus for images shot with a camera, which allows generating a clear image free from blur by hand movement in shooting the image and allows shooting a moving picture tracking a target subject by preventing the jitter of an image due to a hand movement by capturing the subject properly.

2. Description of the Related Art

Conventionally, a large amount of moving picture data is reduced by calculating motion vectors between moving picture frames and generating moving picture data with the motion vectors and a reference image.

On the other hand, a technology has been disclosed for correcting a blur in an image due to a hand movement in shooting it by calculating motion vectors between multiple still images shot by an imaging apparatus such as a camera (refer to Patent Document 1, for example).

The reliability of a motion vector must be increased in order to reproduce the moving picture more accurately and/or correcting the blur due to a hand movement in shooting. As a technology for increasing the reliability of a motion vector, Patent Documents 4 to 6 disclose technologies where processing by handling highly correlated motion vectors as those with high reliability is performed.

Furthermore, a technology for maintaining the accuracy of motion vectors and, at the same time, reducing the data amount to calculate more may include identifying feature points of images and calculating motion vectors about the feature points or forming a polygon by connecting the feature points, recognizing how the polygon is deformed by the movement of the feature points among the images to be compared and estimating the positions where the other points are moved (refer to Patent Documents 2 and 3, for example).

Another technology has been disclosed that uses an affine parameter as motion data in order to increase the freedom of the detection of movement such as a rotation of an image and to efficiently perform a correction process with high accuracy (refer to Patent Document 7, for example)

Patent Document 1: Japanese Unexamined Patent Application Publication No. 2003-78807

Patent Document 2: Japanese Unexamined Patent Application Publication No. 11-506576

Patent Document 3: Japanese Unexamined Patent Application Publication No. 10-341445

Patent Document 4: Japanese Unexamined Patent Application Publication No. 9-73540

Patent Document 5: Japanese Unexamined Patent Application Publication No. 6-311502

Patent Document 6: Japanese Unexamined Patent Application Publication No. 6-153146

Patent Document 7: Japanese Unexamined Patent Application Publication No. 9-98424

By the way, when the function for generating motion data such as a motion vector, an affine parameter or the like is implemented by not special hardware but a computer having a calculation function, how a load on the computer is to be reduced during calculating motion data with high accuracy is a problem.

SUMMARY OF THE INVENTION

The present invention was made in view of the problem, and it is an object of the present invention to provide an image processing apparatus which can calculate motion data with high precision by simpler processing with a smaller amount of data and lighter load on a computer and allows the correction of image blur due to a hand movement in photo-shooting, generation of high quality photographs by using the technology and capture of a subject properly in moving-picture shooting.

In order to achieve the object, there is provided according to an aspect of the invention, an image processing apparatus including an image data input unit for inputting captured multiple images, a detection image generation unit for generating, based on the input images, smaller images by scaling down a certain area of the images, a multi-resolution image data storage unit for storing multi-resolution image data of the smaller images up to a predetermined resolution level such that each of them is identifiable between a reference image and a target image, an feature point set extraction unit for extracting one or more feature point coordinates based on an image corner or edge of the multi-resolution image data of the reference image, and a motion data calculation unit for calculating motion data between a reference image and the target image by using the multi-resolution image data, wherein the motion data calculating unit has a whole-range matching section for performing, with regard to each of the reference images and target images from a lowest resolution L to a predetermined resolution M ($M \leq L$), a matching process on all image coordinates in a predetermined range of the reference images and calculating motion data based on a first energy function whose arguments are the coordinates on the reference images and the target images, and a motion data calculating section for, with regard to image data of a resolution level higher than the predetermined resolution M, performing a block matching process based on a second energy function by setting input motion data as an initial value and handling the feature point coordinates on the reference images, which are extracted by the feature point set extraction unit, as arguments thereof, and for calculating motion data between the reference images and target images by using reliability defined based on energy of the block matching process or strength of feature points and correlation defined based on motion data among the feature points of the reference images or coordinates based on the motion data, and motion data is calculated by a process, wherein the process comprises (a) calculating motion data for image data of a resolution $M-1$, which is a higher resolution than the resolution M, with using motion data for image data of the resolution M, which is calculated by the whole-range matching section, as initial value of motion data to be input to the motion data calculating section, (b) calculating motion data for image data of a higher resolution with using the motion data obtained in the previous calculating process as initial value information of motion data to be input to the motion data calculating section, and (c) repeating the calculation for the image data of higher resolution for predetermined number of times or until a predetermined condition is satisfied.

According to the present invention, multi-resolution images of a reference image and one or more target images are generated. A target image is an image to be compared with the reference image. Then, whole-range matching is performed on image data of a lower resolution to detect a two-dimensional displacement between the reference image and each of the target images. Block matching is performed on image data of a higher resolution to detect a displacement at each feature point. The accuracy of motion data is increased by correcting the motion data of an image of a higher resolution by using the previously calculated motion data sequentially from the lowest resolution to higher resolutions as an initial value.

The "specific range" of the detection image generation unit is not limited to a predetermined certain range but may include a range dynamically depending on a condition. Since the main function of the image processing apparatus is the detection of motion data, the name is replaceable by other names such as "motion data detecting apparatus". The present invention is not limited by the name of the apparatus, and it is intended that the present invention includes all of apparatus having the characteristics above.

Preferably, the motion data to be calculated by the motion data calculating section is an affine parameter. The calculation of the final output at least with an affine parameter allows the detection of movement with a high degree of freedom.

According to the present invention, a two-dimensional (X and Y axes) movement is detected from image data of a lowest resolution or lower resolution than a predetermined resolution by performing whole-range matching, and block matching is used for image data of the predetermined resolution or higher. Furthermore, an affine parameter is used as motion data. Thus, the possibility of the occurrence of a matching error at the lowest resolution can be reduced, and even a movement involving a displaced component such as a rotation can be calculated efficiently.

An image processing apparatus according to the present invention includes an image synthesis unit for calculating an amount of displacement in directions X and Y of two-dimensional coordinates of an input image with reference to a reference image by using the motion data calculated by the motion data calculation unit and based on the degree of displacement between blocks of the target image, dividing the reference image into blocks such that the amount of displacement between blocks can be equal to or lower than a predetermined threshold, calculating two-dimensional travel of the blocks and performing a superposition and/or synthesis process on each block based on the travel.

For example, a superposition process is performed by making approximation of a movement due to a rotation as displacements in X and Y directions, determining the size of blocks for image synthesis and performing block division so as to obtain a displacement of a predetermined or lower value.

In an image processing apparatus according to the present invention, the synthesis unit determines whether coordinate points of four corners of a pre-specified rectangle within a reference image position within a target image or not based on the conversion with motion data, and does not perform superposition of the target image if any one of coordinates positions-outside of the target image or if the amount of displacement between blocks on the coordinates system of the target image is equal to or higher than a predetermined value.

More preferably, the synthesis unit calculates a difference between the reference image and target image in blocks or between a synthesized image and the target image, such as a difference in intensity and/or color of each pixel within the blocks and changes the ratio of superposition to the reference image in blocks based on the difference. The difference may be a sum of square or absolute value of a difference in intensity and/or color. The generation of weighted average image can thin a moving object and clarify a still object only.

According to another aspect of the invention, there is provided an image processing apparatus including an image data input unit for inputting captured multiple images, a detection image generation unit for generating, based on the input images, smaller images of the images in a specific range, a multi-resolution data generation unit for calculating multi-resolution image data up to a predetermined resolution level based on images generated by the detection image generation unit, a frame transforming data generation unit having a motion data detection section for calculating motion data from a reference frame based on the reference frame and an input image, a frame transforming data combining section for calculating a primary frame transforming data based on the motion data and reference frame transforming data, a frame transforming data standardization section for standardizing the primary frame transforming data to calculate secondary frame transforming data, a frame transforming data regularizing section for determining whether a frame transformed by the secondary frame transforming data is within the captured frame or not and regularizing the secondary frame transforming data to make the frame transformed by the secondary frame transforming data fit within the captured frame, and an update section for updating the reference frame and the reference frame transforming data by using the frame transforming data calculated by the frame transforming data regularizing section.

According to the present invention, the reference frame in moving-picture shooting can be updated in real time, and a clear image resulting from the correction of blur due to a hand movement about the reference frame can be generated.

The image processing apparatus may further include a synthesis unit for determining whether coordinate points of four corners of a correction frame rectangle transformed by the frame transforming data are within a shot frame rectangle or not, calculating an optimum frame transforming data to fit the correction frame rectangle within the captured frame rectangle when any of the coordinate points thereof is outside of the captured frame rectangle, and synthesizing the correction frame.

Thus, only the optimum frame transforming data can be output. Maximizing the rectangular area, for example, is one of the methods to obtain the optimum frame transforming data.

According to the invention, two-dimensional motion data is calculated by first performing whole-range matching on image data of a lowest resolution level, and motion data with a high degree of freedom is calculated sequentially by using image data of a higher resolution. Thus, the occurrence of a matching error at the lowest resolution level can be prevented, and highly accurate motion data can be calculated efficiently. A clear image can be generated by synthesizing an image by dividing the image into blocks with a smaller amount of displacement and compensating movements. Thus, a high quality photograph can be generated by reducing image blur due to a hand movement in photo-shooting, and a subject in moving-picture shooting can be properly captured.

BRIEF DESCRIPTION OF THE DRAWINGS

FIG. 5A is the input image I, and FIG. 5B is the output image I' of the local lightness image generation module;

DESCRIPTION OF THE PREFERRED EMBODIMENTS

Embodiments of the present invention will be described below.

First Embodiment

Figure 1:
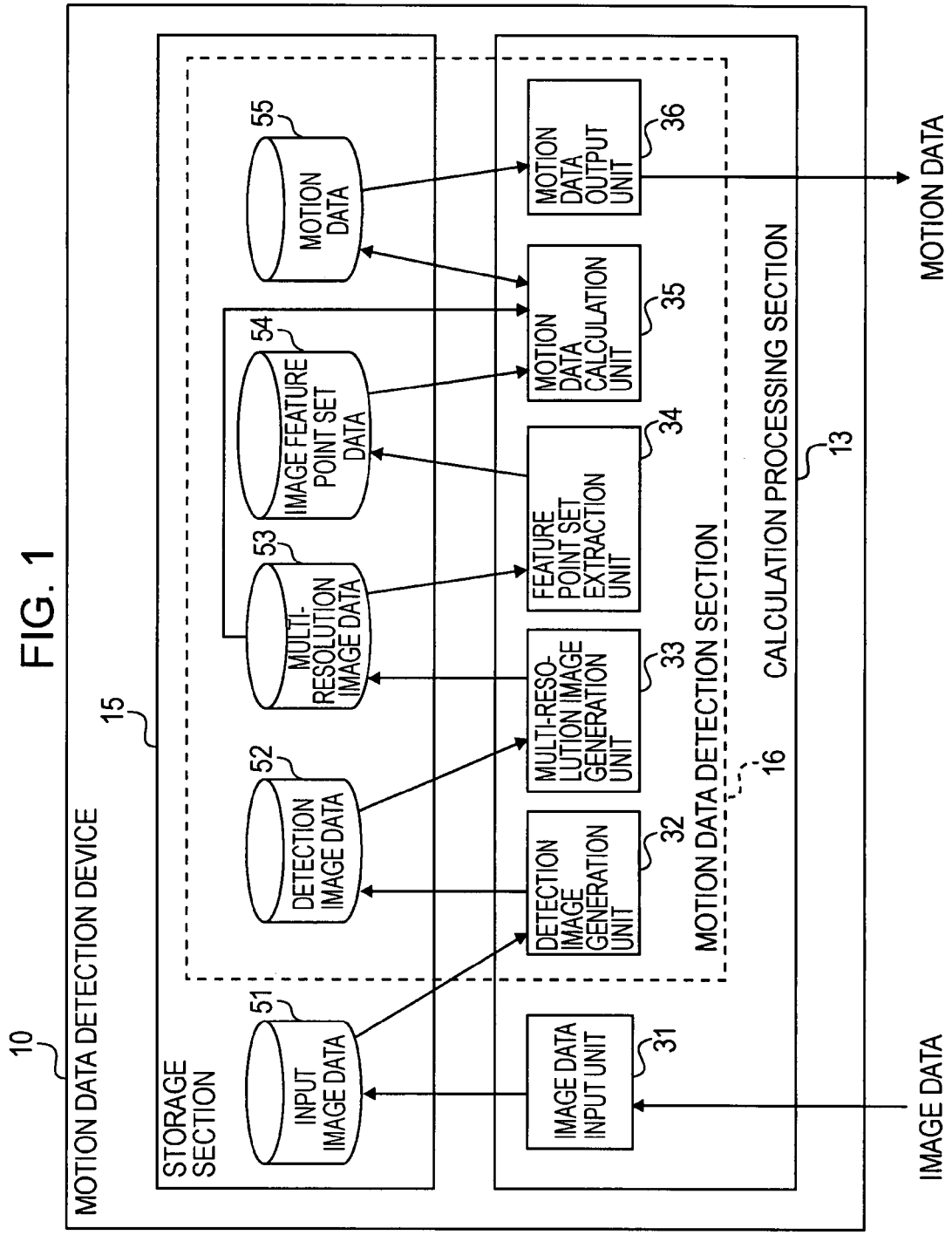
FIG. 1 is a block diagram of a motion data detection device according to a first embodiment of the present invention.
Figure 2A:
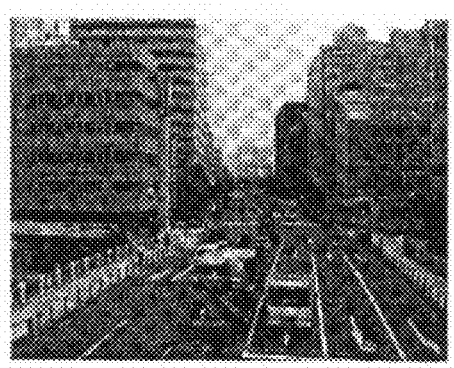
FIGS. 2A to 2D are explanatory diagrams of multi-resolution image data generated by processing by the multi-resolution image generation unit in FIG. 1.
Figure 2B:
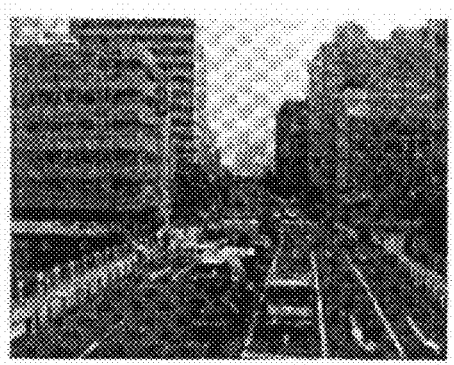
Figure 2C:
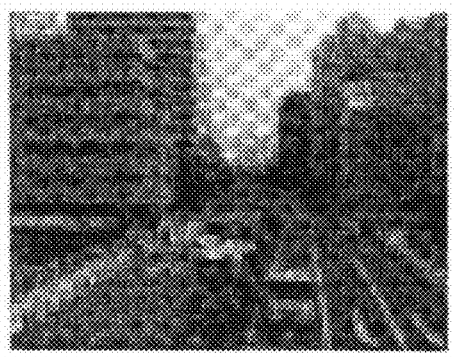
Figure 2D:
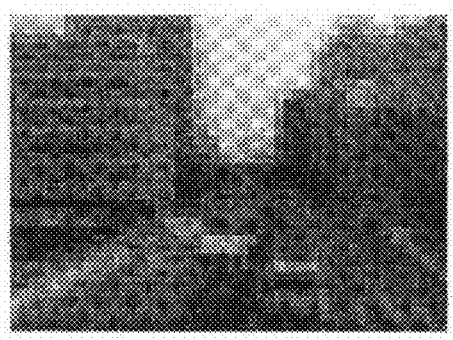

FIG. 1 is a block diagram of a motion data detection apparatus 10 according to this embodiment. The apparatus 10 receives the input of multiple images and calculates motion data among images.

Here, the motion data detection apparatus 10 includes a calculation processing section 13 for calculating motion data such as a motion vector and an affine parameter based on input image data, and a storage section 15 for storing input image data and/or motion data.

The calculation processing section 13 includes an image data input unit (function) 31 for receiving the input of image data from an external device such as a camera, a communication network and a recording medium and storing them in the storage section 15, a detection image generation unit (function) 32 for generating an image (detection image) from which motion data is detected based on input image data, a multi-resolution image generation unit (function) 33 for generating image data of multiple resolution levels by performing a filtering process, a feature point set extraction unit (function) 34 for extracting one or more feature points of an image, a motion data calculation unit (function) 35 for calculating motion data by using multi-resolution image data and/or feature point data, a motion data output unit (function) 36 for outputting calculated motion data. The units 31 to 36 are implemented by functions of a CPU. These units do not have to be separated but may also serve as other units. For example, the motion data calculation unit 35 may also function as the motion data output unit 36.

Here, the data to be stored in the storage section 15 will be described. Image data is data having w×h grids where the width is w and the height is h and having a pixel value (such as RGB and YCbCr) at each of the grids.

Image feature point set data is a set of feature point data of image data, and each feature point includes the coordinate value (x,y) and/or a feature amount indicating the strength of a feature point.

Motion data of an image may be generally an affine parameter or a motion vector. A motion vector may be motion vector mesh data which has multiple motion vector points, motion vector lines and/or motion vector areas.

Next, a method for calculating motion data by operating the apparatus 10 (motion data calculation method) will be described.

[Image Data Input Process]

First, externally input image data is stored in an input image data storage unit 51 by the image data input unit 31.

[Detection Image Generation Process]

Next, the detection image generation unit 32 is started, and an image (detection image), on which the detection of motion data is based, is generated from an input image.

When the detection image generation unit 32 is started, a thumbnail image, which is a smaller input image, is generated, and a clipped image is generated by cutting off the four sides of the image by a predetermined proportion (such as vertically and horizontally 10% off), and the correction of the aspect ratio is performed thereon as required. An intensity image is generated from the corrected image and is stored as a detection image in a detection image data storage unit 52.

[Multi-Resolution Image Generation Process]

Next, the detection image undergoes a filtering process by the multi-resolution image generation unit 33, and the image of a low resolution is generated and is stored in a multi-resolution image data storage unit 53.

The multi-resolution image generation unit 33 upon startup may perform an edge image generation process, for example, on the detection image, and an image of the resolution level 0 is generated. Furthermore, image data of lower resolutions are generated by applying a blur filter and/or averaging filter on each image of the resolution level 0, and the generated multi-resolution image data is stored in the multi-resolution image data storage unit 53. Instead of the use of a blur filter, for example, the multi-resolution image may be scaled down by a certain ratio, and the resolution may be reduced in a stepwise manner. FIGS. 2A to 2D are an example of the multi-resolution image generated by the multi-resolution image generation unit 33. As the numerical value of the resolution level increases (the direction from FIGS. 2A to 2D), the resolution decreases.

[Feature Point Set Extraction Process]

Next, the feature point set extraction unit 34 upon startup extracts feature points based on the strength of edges and/or corners. When a feature point is generated at one position, the generation of other feature points is prevented in the vicinity. This is because motion data at one position in an image may have a substantially identical value to that of motion data in the vicinity, and feature points are preferred to be distributed entirely and evenly in order to detect the movement of the entire image.

[Motion Data Calculation Process]

The motion data calculation unit 35 uses a reference image and target image stored in the multi-resolution image data storage unit 53 to calculate motion data by following the steps below:

[Step 1]

Whole-range matching is performed for the roughest resolution (lowest resolution) in multi-resolution matching, and a parallel travel $(d_x, d_y)$ between two images is obtained. Making the roughest image, at most, several tens pixels×several tens pixels, for example, does not considerably increase the calculation costs for the whole-range matching. Furthermore, the calculation of the parallel travel $(d_x, d_y)$ is only required because the parallel travel is dominant in the entire movement in hand-movement correction.

Figure 3:
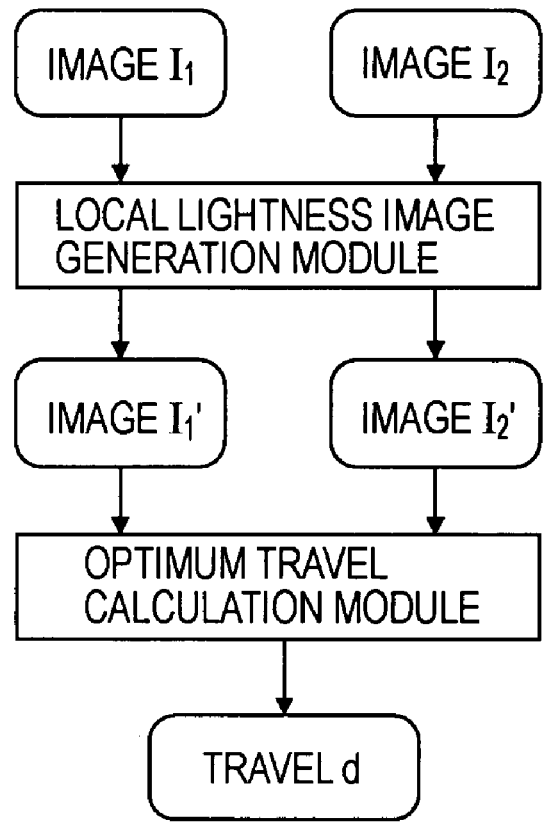
FIG. 3 is a processing block diagram of whole-range matching to be performed by the motion data calculation unit in FIG. 1.

FIG. 3 is a processing block diagram of the whole-range matching. First of all, a local lightness image generation module calculates a local lightness of an image by:

$$I'(x, y) = I(x, y) - \sum_{\substack{x-s \leq p \leq x+s \\ y-s \leq q \leq y+s}} I(p, q)/(2s+1)^2 \quad (1)$$

Figure 4:
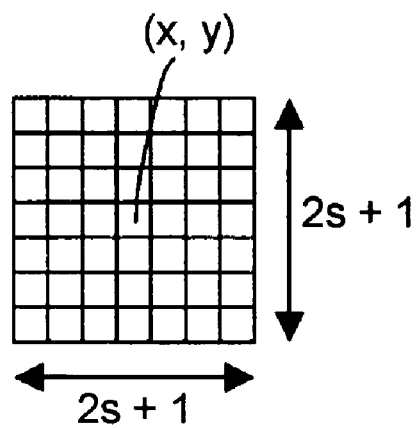
FIG. 4 is an explanatory diagram illustrating details of processing by the local lightness image generation module in FIG. 3.

Here, $I(x,y)$ is the lightness at coordinates $(x,y)$ of an input image, $I'(x,y)$ is the lightness at the coordinates $(x,y)$ of an output local lightness image, and s is a constant that determines the size of a local area. The local lightness given by the equation represents a relative lightness of a pixel to the average lightness of the pixel and the surroundings (see FIG. 4).

Figure 5A:
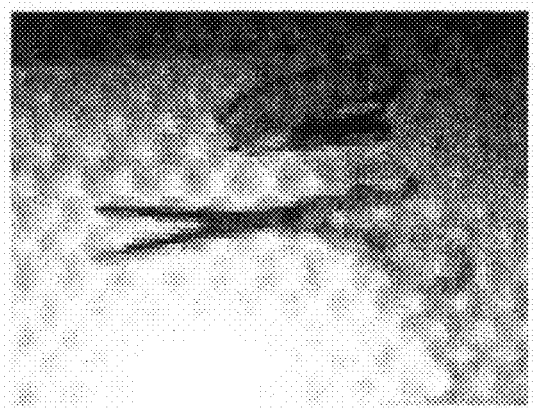
FIGS. 5A and 5B are diagrams for showing a difference between the input image I and image I' in FIG. 3.
Figure 5B:
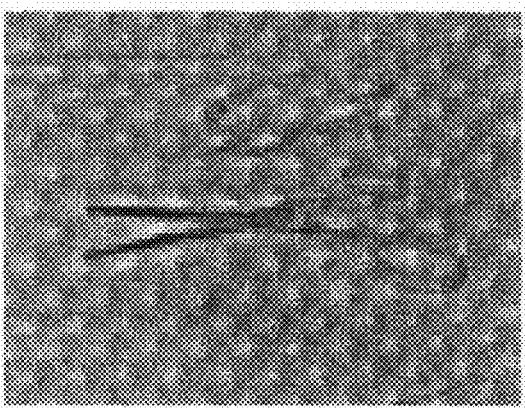

Examples of actual input images I and I' are shown in FIGS. 5A and 5B. FIG. 5A is an example of the input image I, and FIG. 5B is an example of the image I'.

This process can correct a change of light condition due to a hand movement and the darkness of an image edge part caused by a low quality imaging lens, for example.

Next, an optimum travel calculation module calculates the travel $(d_x, d_y)$ from the image $I_1$ to the image $I_2$. First, the travel energy $E(d_x, d_y)$ of the travel from $I_1$ to $I_2$ by $(d_x, d_y)$ is defined as:

$$E(d_x, d_y) = \frac{\sum_{\substack{x \\ y}} |I_1(x+d_x, y+d_y) - I_2(x, y)|}{(W - |d_x|)(H - |d_y|)} \quad (2)$$

Figure 6:
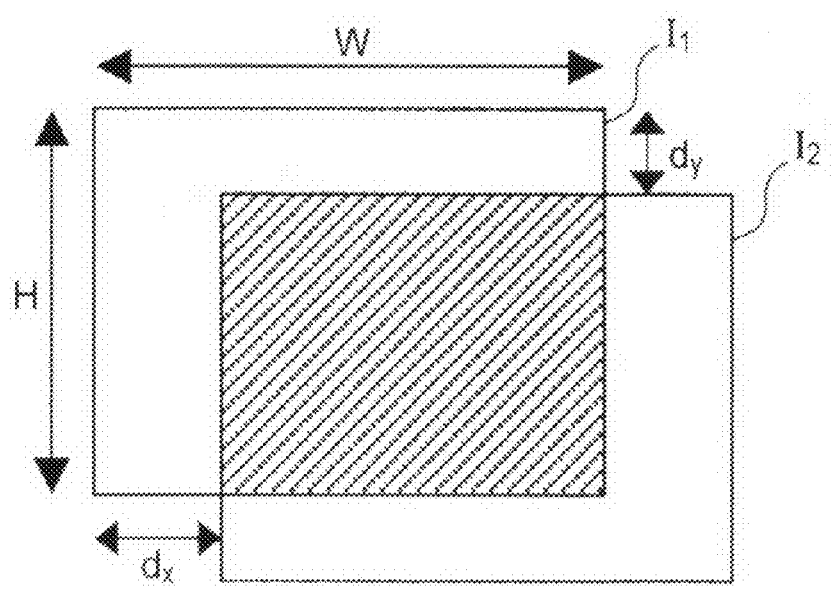
FIG. 6 is an explanatory diagram illustrating details of processing by the optimum travel calculation module in FIG. 3.

Here, W indicates the width of an image, and H is the height of the image. $E(d_x, d_y)$ is the average of the absolute values of differences in pixel values in a overlapping part (shaded part in FIG. 6) of the images $I_1$ and a image obtained by shifting $I_2$ with $(d_x, d_y)$. Here, $E(d_x, d_y)$ may be the average of sums of square of differences in pixel value.

As $E(d_x, d_y)$ decreases, the degree of similarity between images increases. The optimum travel modulation module outputs $(d_x, d_y)$ such that the value can be minimum.

The process above provides the travel $(d_x, d_y)$ from the image $I_1$ to the image $I_2$ as motion data.

[Step S2]

Next, the motion data is handled as the initial value of the motion data of an image of the resolution L−1, and a block matching process therewith is performed.

An affine parameter is calculated by the least square method as motion data for images of resolutions L−1 and higher.

The equation in this case is as follows:

$$v_{i+1}(x_1, y_1) = (X_{i+1}^{-1} V_{i+1})^T \begin{pmatrix} x_1 \\ y_1 \end{pmatrix} - \begin{pmatrix} x_1 \\ y_1 \end{pmatrix} \quad (3)$$

where $$X_{i+1}(x_1, y_1) = \sum_{\text{surrounding of } (x_2,y_2) \in (x_1,y_1)} a_i(x_1, y_1, x_2, y_2) r_i(x_2, y_2) \begin{pmatrix} x_2 x_2 & x_2 y_2 & x_2 \\ x_2 y_2 & y_2 y_2 & y_2 \\ x_2 & y_2 & 1 \end{pmatrix}; \quad (4)$$

$$V_{i+1}(x_1, y_1) = \sum_{\text{surrounding of } (x_2,y_2) \in (x_1,y_1)} a_i(x_1, y_1, x_2, y_2) r_i(x_2, y_2) \begin{pmatrix} u_2 x_2 & v_2 y_2 \\ u_2 y_2 & v_2 y_2 \\ u_2 & v_2 \end{pmatrix}; \quad (5)$$

and $$(u_2, v_2) = (x_2, y_2) + v_i(x_2, y_2) \quad (6)$$

The affine parameter calculated by the process is used as the initial value of motion data of the next resolution.

[Step S3]

Next, whether the process reaches the final resolution (which is the resolution level 0 normally) or not is determined. If not, processing in step S2 and subsequent steps are repeated on image data of the next higher resolution level. The motion data of the final resolution is stored in the motion data storage unit 55.

Having described the case that the whole-range matching process is only performed on images of the lowest resolution L in step S1 above, the whole-range matching process may be performed on image data of the lowest resolution L to a certain resolution M (M≦L) with a higher resolution level, and the block matching process in step S2 and subsequent steps may be performed on image data of resolutions from a resolution M−1 with a higher resolution level.

[Motion Data Output Process]

The motion data output unit 36 outputs motion data calculated by the motion data calculation unit 35 and stored in the motion data storage unit 55 to an external storage device, a communication network or another program module, for example.

The motion data detection device 10 can operate on a standalone basis by capturing image data through a storage medium or over a network and also can perform image processing in real time by capturing image data by various equipment such as a camera. For example, the device may be built into a camera module to implement a camera with a hand-movement correction device (or an anti-blur function).

According to this embodiment, multi-resolution images of a reference image and a target image are generated, and whole-range matching is first performed on an image of a lower resolution to detect a two dimensional displacement between the images. A block matching process is performed on an image of a higher resolution to detect a displacement of a high degree of freedom, such as an affine parameter. The accuracy of motion data is increased by calculating the motion data from the lowest resolution to higher resolutions, and calculating the motion data at the next higher resolution by using the previously calculated motion data as an initial value of the motion data at the next higher resolution. Thus, the matching error for lower resolutions can be prevented, and highly accurate motion data can be calculated efficiently. Therefore, the hand-movement correction in shooting with a digital camera can be performed quickly.

Second Embodiment

Figure 7:
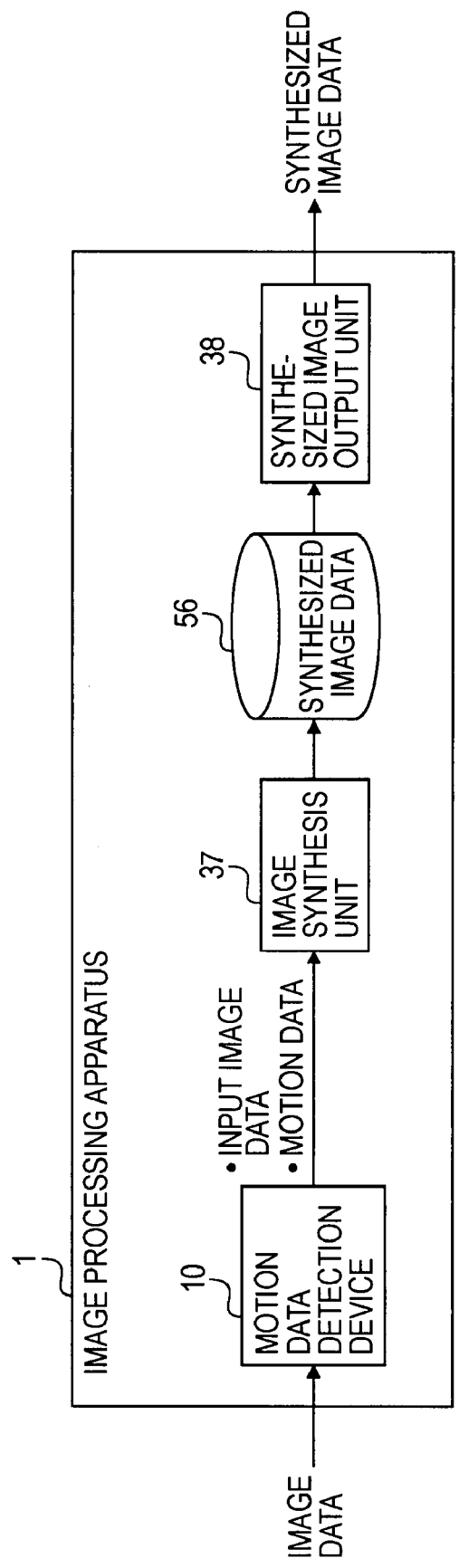
FIG. 7 is a block diagram of an image processing apparatus according to a second embodiment of the present invention.

FIG. 7 is a block diagram of an image processing apparatus 1 according to this embodiment. Here, the image processing apparatus 1 includes a motion data detection device 10, an image synthesis unit 37 for synthesizing an image by using motion data generated by the device 10 and multiple pieces of input image data, and a synthesized image output unit 38 for outputting the generated synthesized image data. The units 37 and 38 are implemented as functions of a CPU.

Next, operations of the image processing apparatus 1 according to this embodiment will be described. Since the operations of the motion data detection device 10 are the same as those of the first embodiment, the description will be omitted here.

[Image Synthesis Process]

Figures 8A, 8B:
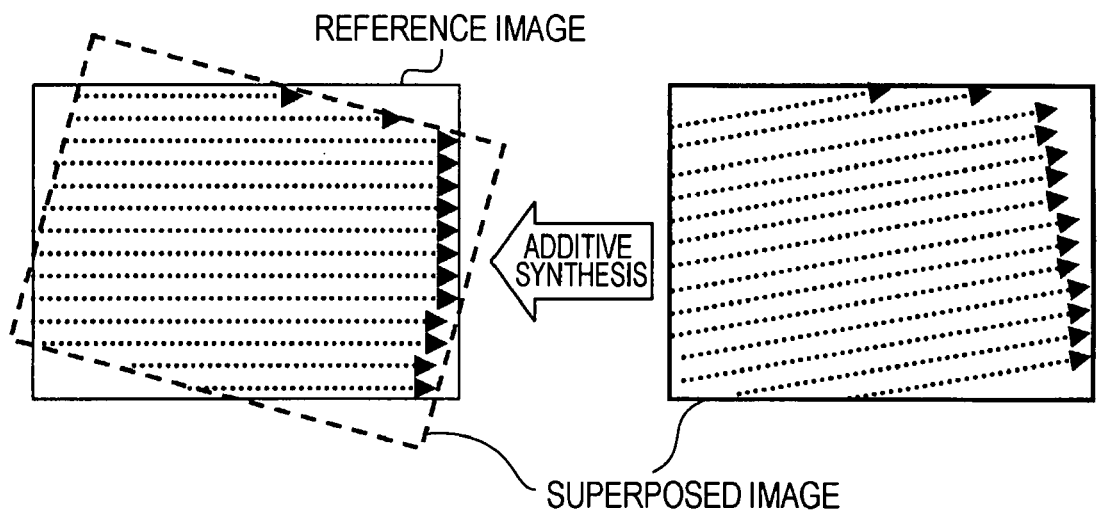
FIGS. 8A and 8B are explanatory diagram of a superposition process to be performed by the image synthesis unit in FIG. 7.

In order to perform processing for deforming one image or processing for deforming and superposing multiple images, processing is required for obtaining colors of pixels from the position of an image before deformation to the position of the deformed image as shown in FIGS. 8A and 8B. In this case, scanning an image before deformation diagonally is required. The scanning process is performed by using a coordinate conversion equation as:

$$\begin{pmatrix} X \\ Y \\ 1 \end{pmatrix} = \begin{pmatrix} c_{11} & c_{12} & c_{13} \\ c_{21} & c_{22} & c_{23} \\ 0 & 0 & 1 \end{pmatrix} \begin{pmatrix} x \\ y \\ 1 \end{pmatrix} \quad (7)$$

Disadvantageously, the processing can be executed by hardware such as a three-dimensional graphics engine, but hardware specialized for DMA access of a rectangular area in a camera module can not process it, for example.

EQ7 is an example of the case that deformation is performed by affine transformation. The (x,y) on the right side indicates the position of the pixel of an image (reference image) after deformation, and the (X,Y) on the left side indicates the position of the pixel of the image (to be superposed) before deformation.

Figures 9A, 9B:
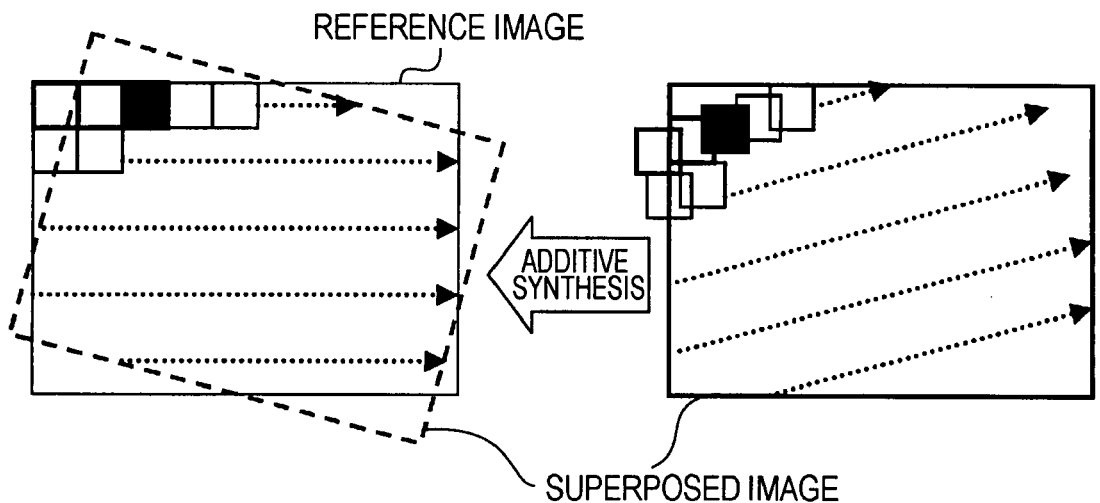
FIGS. 9A and 9B are explanatory diagram of a block transfer process by the image synthesis unit in FIG. 7.

According to this embodiment, an image is divided into small blocks as shown in FIGS. 9A and 9B, and a transfer process is performed in blocks. Thus, the process can be implemented by DMA hardware that is described above.

The block transfer process by the image synthesis unit 37 will be described below.

In order to calculate the position of a block in an image before deformation, the center position (xc,yc) of the block is calculated (EQ8) from the block starting position (xs,ys) and end position (xe,ye) of the image after deformation, while a coordinate conversion equation as EQ7 is applied (EQ9) to calculate the block starting position (Xs,Ys) and end position (Xe,Ye) of the image after deformation (EQ10).

$$\begin{pmatrix} x_c \\ y_c \end{pmatrix} = \frac{1}{2}\left(\begin{pmatrix} x_s \\ y_s \end{pmatrix} + \begin{pmatrix} x_e \\ y_e \end{pmatrix}\right) \quad (8)$$

$$\begin{pmatrix} X_c \\ Y_c \\ 1 \end{pmatrix} = \begin{pmatrix} c_{11} & c_{12} & c_{13} \\ c_{21} & c_{22} & c_{23} \\ 0 & 0 & 1 \end{pmatrix} \begin{pmatrix} x_c \\ y_c \\ 1 \end{pmatrix} \quad (9)$$

$$\begin{pmatrix} X_s \\ Y_s \end{pmatrix} = \begin{pmatrix} X_c \\ Y_c \end{pmatrix} + \begin{pmatrix} x_s \\ y_s \end{pmatrix} - \begin{pmatrix} x_c \\ y_c \end{pmatrix}, \quad (10)$$

$$\begin{pmatrix} X_e \\ Y_e \end{pmatrix} = \begin{pmatrix} X_c \\ Y_c \end{pmatrix} + \begin{pmatrix} x_e \\ y_e \end{pmatrix} - \begin{pmatrix} x_c \\ y_c \end{pmatrix}$$

Figure 10A:
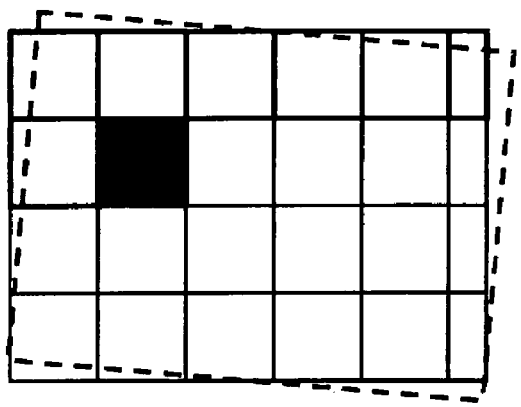
FIGS. 10A and 10B are explanatory diagrams of block division to be performed when the image synthesis unit in FIG. 7 is applied to lens distortion correction.
Figure 10B:
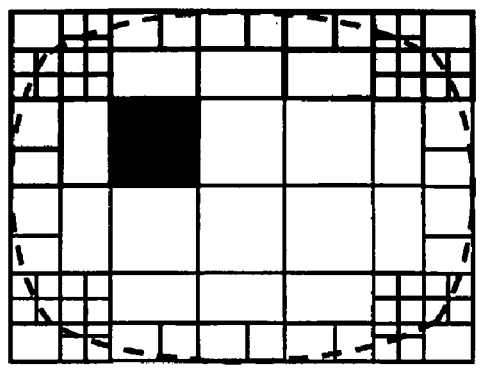

This method is also applicable to lens distortion correction as in FIG. 10B. Lens distortion information is held as mesh motion vector data, and the mesh motion vector data is used to calculate the motion vector (uc,vc) of the center position of the blocks. Then, instead of EQ9, the equation below is used.

$$\begin{pmatrix} X_c \\ Y_c \end{pmatrix} = \begin{pmatrix} x_c \\ y_c \end{pmatrix} + \begin{pmatrix} u_c \\ v_c \end{pmatrix} \quad (11)$$

Figure 11A:
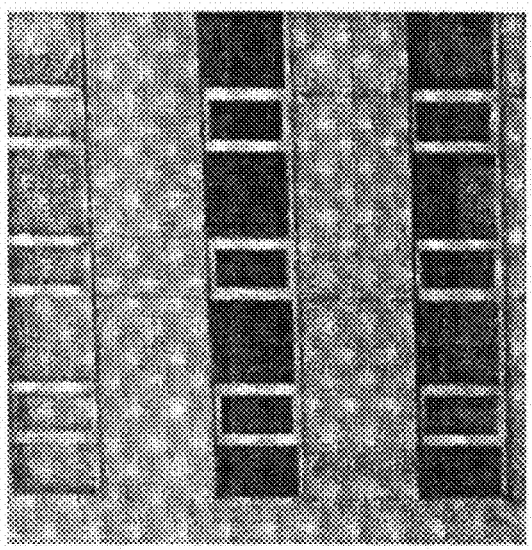
FIGS. 11A to 11C are explanatory diagrams of displacements occurring at joints of blocks during an image synthesis process.
Figure 11B:
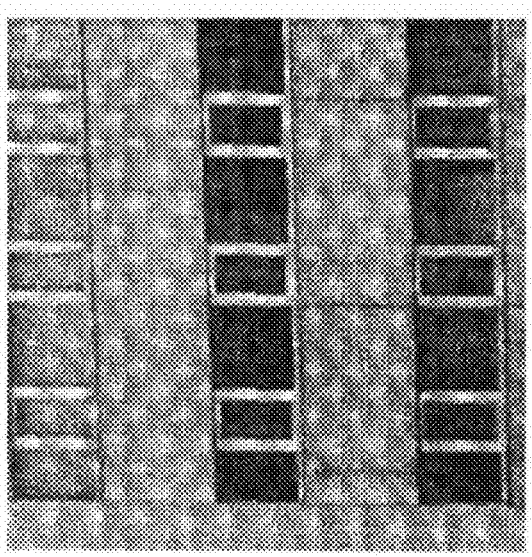

However, performing the processing by this method deteriorates the quality of the synthesized image. The most problematic deterioration of image quality is a phenomenon that a displacement occurs at the joint of blocks and the discontinuity between the blocks appears which can be seen in FIG. 11A. The reduction of the block size does not alleviate it very much. FIGS. 11A and 11B show images resulting from the superposition of four blocks each of which is a 128-pixel square and a 16-pixel square, respectively.

Figure 11C:
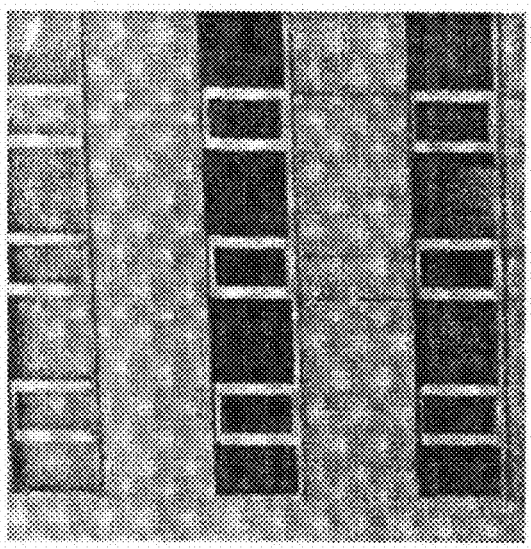
Figure 12A:
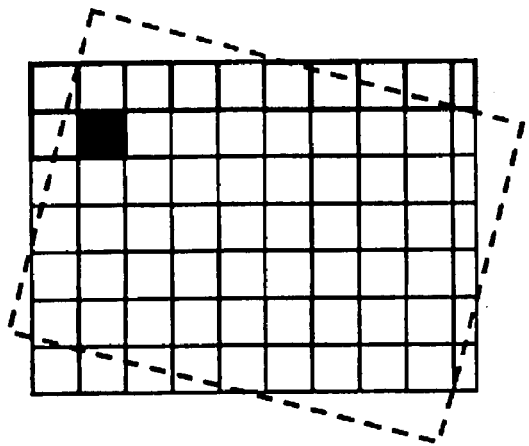
FIGS. 12A and 12B are explanatory diagrams of processing for superposing images by moving the position of the boundary of blocks in the image synthesis unit in FIG. 7.
Figure 12B:
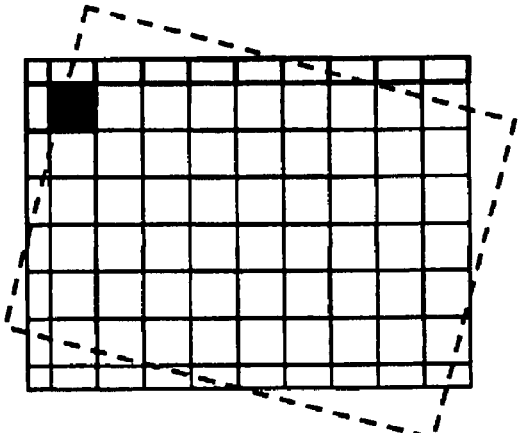

The phenomenon can be eased by changing the position of the boundary of blocks of each image to be superposed as shown in FIGS. 12A and 12B. (FIG. 11C shows an image synthesized by changing the positions of the boundaries of four images where the block size is a 128-pixel square). When a few images are to be superposed or when one image is to be deformed, the phenomenon can be also eased by superposing a same image several times by changing the position of the boundary.

Some degree of deformation may not require the reduction of the size of the block very much, but, conversely, a high degree of deformation may prevent the processing. In this case, the adaptive change of the size of a block can prevent the deterioration of image quality and allows more efficient processing. The size of all blocks can be changed uniformly as shown in FIG. 10A, or the size of block subject to a high degree of deformation can be only reduced as shown in FIG. 10B.

For example, the equation for determining the block size based on the parameter of affine transformation is as follows:

$$\text{blocksize} = \frac{s}{\max\begin{pmatrix} |c_{11}+c_{12}-1|, |c_{11}-c_{12}-1|, \\ |c_{22}+c_{21}-1|, |c_{22}-c_{21}-1| \end{pmatrix}} \quad (12)$$

Here, the value s is a preset value, and a value in the vicinity of one (1), which is a larger than zero (0), is selected therefor. The value s may be set smaller when the processing power is high. However, effect of enhancing the quality of synthesized image can be enjoyed only to a certain small value. That is, if the value s is made smaller than that value, image quality enhancing effect is no more increased. The threshold is larger when blocks can be only moved in units of 2 pixels or 4 pixels due to the processing ability of the hardware. In this case, a large s (such as 2) is more advantageous for the processing speed.

[Correction Failure Determination Process [Off the Rectangle]]

Forming one image by synthesizing multiple images may deteriorate the S/N ratio of the part where the superposition is not performed. In order to prevent this, image clipping must be performed. For maintaining the S/N ratio in a clipping rectangle, the number of the images to be superposed may be same through all the area within the clipping rectangle. When the size and position of the clipping rectangle are specified in advance and if there is an image of which the corrected image does not cover all area of the clipping rectangle, such image is not superposed. This is because it is determined that the correction of such image is failed. The determination method in this case is the same as that of moving picture hand-movement correction according to the third embodiment, which will be described later.

[Correction Failure Determination Process [Rotation]]

A high degree of rotation in superposition in the block synthesis process may deteriorate the clearness of the synthesized image, or adaptive processing may prevent a sufficient speed since the block size is excessively small. In this case, "success" is determined if an optimum block size calculated by EQ12 is higher than a predetermined value min_blocksize while "failure" is determined if lower.

$$\text{blocksize} > \text{min\_blocksize} \quad (13)$$

According to this embodiment, a synthesized image is divided into semi-blocks and is transferred by defining the transfer starting position and end position. Thus, even with a displacement component such as a rotation, the effective application of hardware such as a DMA is allowed in memory transfer during image data synthesis, and a clear synthesized image can be generated quickly. In generating a synthesized image by superposing multiple images, the boundaries of blocks can be inconspicuous by dividing transfer blocks at slightly different positions (about 1 to several pixels). Furthermore, the distortion of an image can be corrected by changing the block size depending on degrees of deformation (displacement).

The proportion of synthesis of blocks may be changed in accordance with the intensity and/or the magnitude of a difference in color within blocks. For example, a moving object can be inconspicuous by reducing the proportion of synthesis for a large difference. Conversely, a moving object can be clarified by increasing the proportion of synthesis as the magnitude of the difference increases.

Third Embodiment

A case that the present invention is applied to a moving picture will be described as the next third embodiment.

[Outline of Hand-Movement Correction in Moving Pictures of High-Degree of Freedom]

Figure 13A:
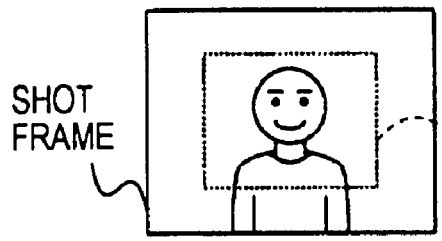
FIGS. 13A to 13D are schematic explanatory diagrams of hand-movement correction on a moving picture according to a third embodiment of the present invention.
Figure 13B:
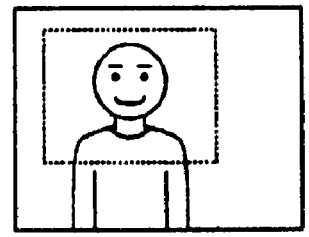

In a conventional and general electronic moving picture hand-movement correction (i.e. anti-shake technology), hand-movement correction is achieved by detecting how much a shot frame displaces from a reference frame and outputting a corrected frame by moving the shot frame in parallel based on a detected travel. For example, as shown in FIG. 13A, a corrected frame (output frame) is assumed to set as indicated by the dashed line in order to shoot moving pictures of a person. Next, when the shot frame is displaced by a hand-movement as shown in FIG. 13B, the corrected frame (output frame) is moved in parallel as indicated by the dashed line and output in response thereto. The amount of displacement is detected by a gyrosensor and/or image processing.

Figure 13C:
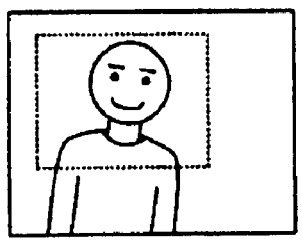
Figure 13D:
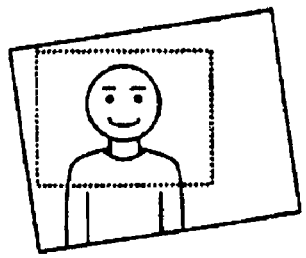

However, in the hand-movement correction technology only with parallel movement, resulting frames are unnatural when a movement in the direction of rotation or scaling occurs as shown in FIG. 13C. Accordingly, the implementation of more natural hand-movement correction, in which movement other than parallel movement is detected, is to be considered so as to provide a corrected frame as shown in FIG. 13D.

[Definition of Frame Transforming Data of Moving Picture Hand-Movement Correction with High-Degree of Freedom]

Frame transforming data C from a corrected frame to a shot frame is defined as follows:

$$\begin{pmatrix} X \\ Y \\ 1 \end{pmatrix} = C \begin{pmatrix} x \\ y \\ 1 \end{pmatrix} \\ C = \begin{pmatrix} C_{11} & C_{12} & C_{13} \\ C_{21} & C_{22} & C_{23} \\ 0 & 0 & 1 \end{pmatrix} \quad (14)$$

Figure 14:
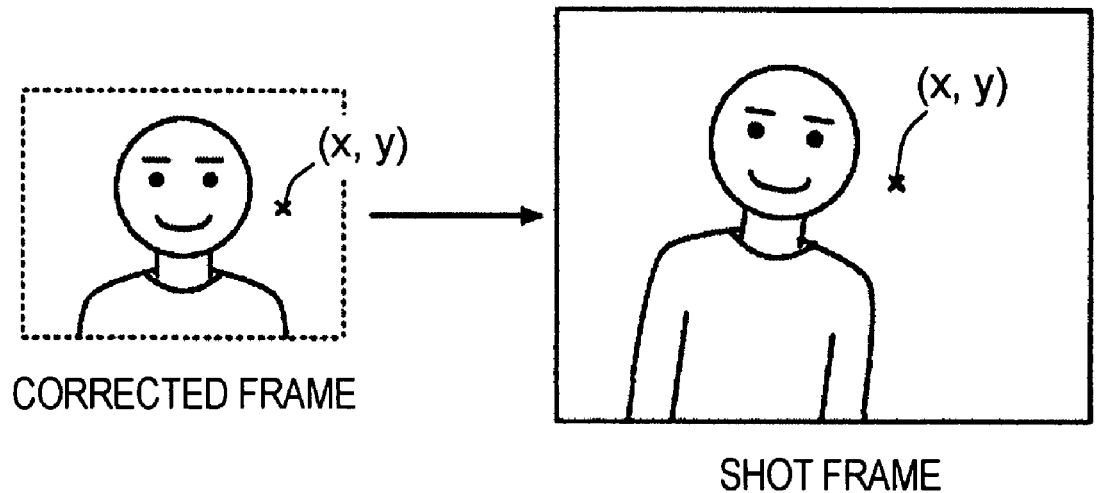
FIG. 14 is an explanatory diagram of a coordinate position in correction and shot frames according to the third embodiment of the present invention.

Here, $(x,y,1)^t$ is the coordinate position of a corrected frame, and $(X,Y,1)^t$ is the coordinate position of a shot frame (FIG. 14). With the transforming data C, movement through six degrees of freedom ($C_{11}$ to $C_{23}$) including rotation, scaling, parallel movement and shearing can be addressed. In order to address rotation, scaling and parallel movement only, the transforming data C may be defined as follows:

$$C = \begin{pmatrix} C_{11} & C_{12} & C_{13} \\ -C_{12} & C_{11} & C_{23} \\ 0 & 0 & 1 \end{pmatrix} \qquad (15)$$

where four degrees of freedom ($C_{11}$, $C_{12}$, $C_{13}$, $C_{23}$) are provided. Notably, the freedom may be called dimension or axis.

[Processing of High Degree of Freedom Moving Picture Hand-Movement Correction]

Figure 15:
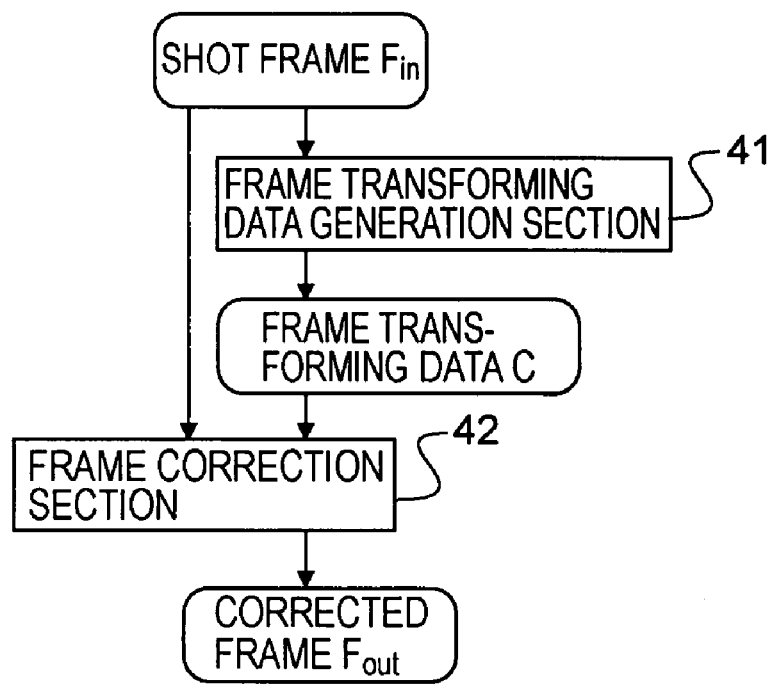
FIG. 15 is a processing block diagram of hand-movement correction on a moving picture according to the third embodiment of the present invention.

The processing blocks for moving picture hand-movement correction are as shown in FIG. 15. First, a frame transforming data generation section 41 receives a shot frame $F_{in}$ and outputs motion data M. The details of the frame transforming data generation section 41 will be described later. Next, a frame correction section 42 outputs corrected frame $F_{out}$ from the shot frame $F_{in}$ and frame transforming data C. When the frame transforming data C is a 3×3 matrix, the frame correction section 42 performs processing for transforming an image by using general affine transformation. The frame transforming data generation section 41 and the frame correction section 42 are functions to be implemented by the calculation processing section 13 of the image processing apparatus 1.

[Frame Transforming Data Generation Section]

Next, the processing by the frame transforming data generation section 41 will be described.

Figure 16:
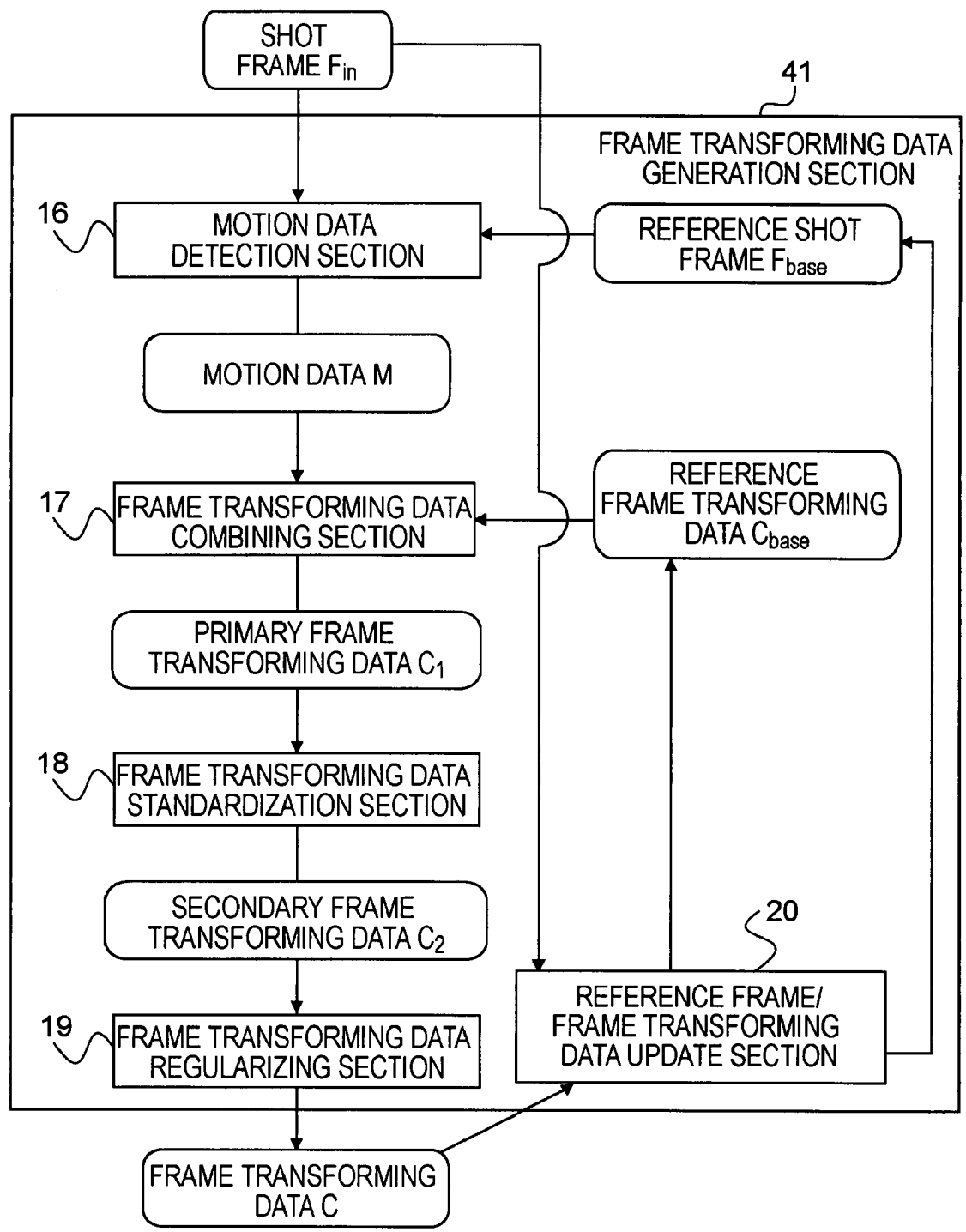
FIG. 16 is an internal processing block diagram of the frame transforming data generation section in FIG. 15.

The processing blocks within the frame transforming data generation section 41 are as shown in FIG. 16.

The frame transforming data generation section 41 holds a reference frame $F_{base}$ and a reference frame transforming data $C_{base}$ as internal data. The reference frame $F_{base}$ is a frame on which movement detection is based when new shot data is input. $F_{base}$ does not have to hold all frame data (image data) and may hold data required for movement detection only. The reference frame transforming data $C_{base}$ is frame transforming data from a corrected frame to $F_{base}$ and is held in a 3×3 matrix as well as that of the output frame transforming data C.

Initially, nothing is defined for $F_{base}$ (or information indicating the initial state is held therein), and $C_{base}$ is set to the standard frame transforming data $C_0$, which is given by:

$$C_0 = \begin{pmatrix} 1 & 0 & 0.5(W-w) \\ 0 & 1 & 0.5(H-h) \\ 0 & 0 & 1 \end{pmatrix} \qquad (16)$$

Figure 17:
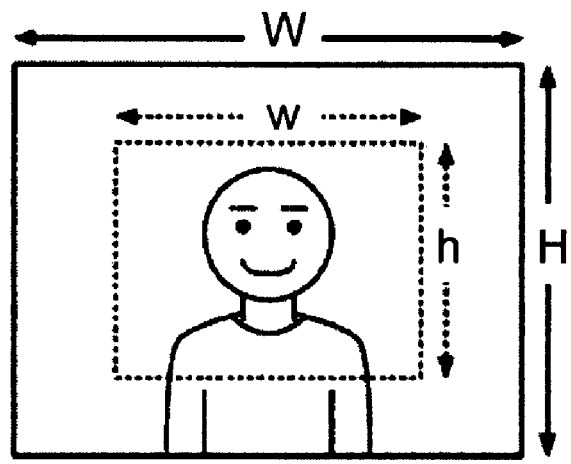
FIG. 17 is an explanatory diagram of standard frame transforming data of the frame transforming data generation section in FIG. 15.

Here, W and H indicate the width and height of a shot frame, and w and h indicate the width and height of a corrected frame. The standard frame transforming data $C_0$ defined in this way induces transformation to display exactly the center of the shot frame onto the corrected frame (FIG. 17).

When the first shot frame is input initially, the frame is set as $F_{base}$ first.

When a new shot frame $F_{in}$ is input to the frame transforming data generation section 41, the motion data detection section 16 first compares it with the reference frame $F_{base}$ and outputs motion data M from $F_{base}$ to $F_{in}$. The motion data M is also a 3×3 matrix like the frame transforming data C. The motion data detection section 16 is a function to be implemented by the units enclosed by the dashed line in FIG. 1 and receives the input of a shot frame (image data) and outputs motion data (frame transforming data)

Next, the frame transforming data combining section 17 combines the detected motion data M and the reference frame transforming data $C_{base}$ and outputs primary frame transforming data $C_1$ by the following equation:

$$C_1 = M \cdot C_{base} \qquad (17)$$

Figure 18:
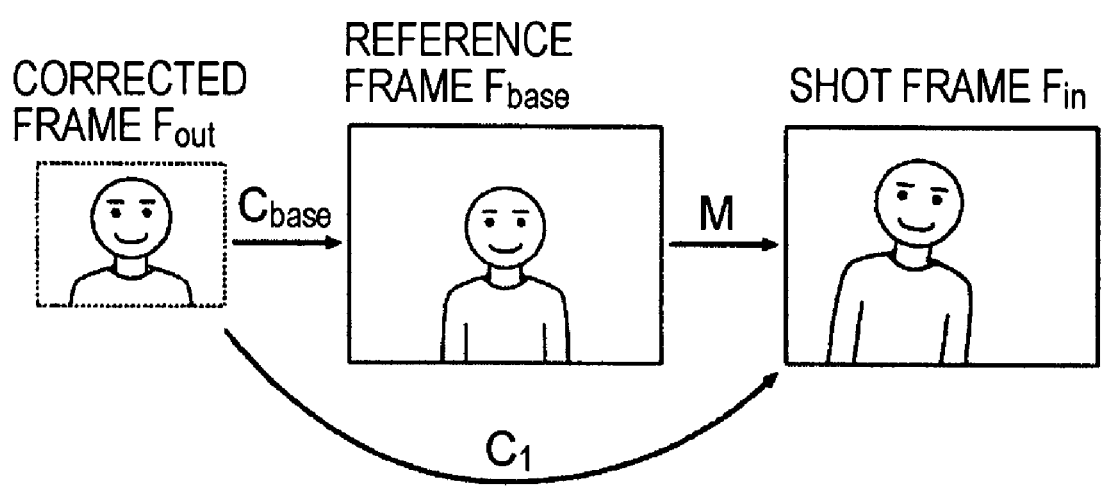
FIG. 18 is an explanatory diagram of generating a frame transforming data from a correction frame to a shot frame by the frame transforming data combining section in FIG. 16.

This $C_1$ expresses frame transforming data from a corrected frame to a shot frame as shown in FIG. 18.

Figure 19A:
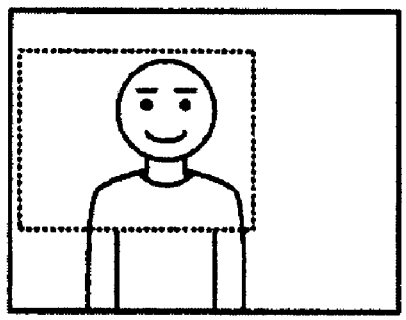
FIGS. 19A and 19B are explanatory diagrams of an operation by the frame transforming data standardization section in FIG. 16.
Figure 19B:
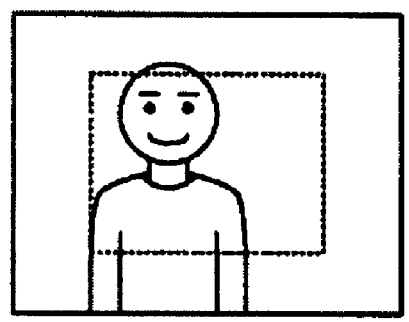

The primary frame transforming data $C_1$ is converted to secondary frame transforming data $C_2$ by the frame transforming data standardization section 18. This conversion brings $C_2$ closer to the standard frame transforming data $C_0$ than $C_1$. This is because the state of the standard frame transforming data $C_0$ allows correcting jitter of an image due to a hand-movement in the most stable manner. For example, the frame transforming data as shown in FIG. 19A cannot move the corrected frame to the left side very much. However, as shown in FIG. 19B, the corrected frame at the center of a shot frame (with the frame transforming data $C_0$) can be moved to any of the above, below, left and right to some extent.

In this processing, $C_1$ may be strongly brought close to $C_0$ as the difference between $C_1$ and $C_0$ increases. Thus, the speed of the convergence increases, and screens change more naturally when the focus point of a photo-shooting person moves by panning, etc. For example, when $$C_1 = \begin{pmatrix} C_{11}^1 & C_{12}^1 & C_{13}^1 \\ C_{21}^1 & C_{22}^1 & C_{23}^1 \\ 0 & 0 & 1 \end{pmatrix}, \qquad (18)$$

$$C_2 = \begin{pmatrix} C_{11}^2 & C_{12}^2 & C_{13}^2 \\ C_{21}^2 & C_{22}^2 & C_{23}^2 \\ 0 & 0 & 1 \end{pmatrix}$$

the values of $C_2$ are calculated as follows:

$$\left. \begin{array}{l} C_{11}^2 = C_{11}^1 + r \times (1 - C_{11}^1) \\ C_{12}^2 = C_{12}^1 + r \times (0 - C_{12}^1) \\ C_{13}^2 = C_{13}^1 + r \times (0.5(W-w) - C_{13}^1) \\ C_{21}^2 = C_{21}^1 + r \times (0 - C_{21}^1) \\ C_{22}^2 = C_{22}^1 + r \times (1 - C_{22}^1) \\ C_{23}^2 = C_{23}^1 + r \times (0.5(H-h) - C_{23}^1) \end{array} \right\} \qquad (19)$$

Here, r is a convergence constant and a value equal to or lower than one (1). As the value increases, the speed of convergence to the standard frame transforming data $C_0$ increases.

Figure 20A:
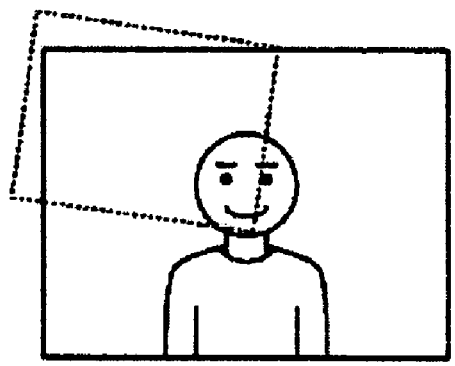
FIGS. 20A and 20B are explanatory diagrams of an operation by the frame transforming data regularizing section in FIG. 16.
Figure 20B:
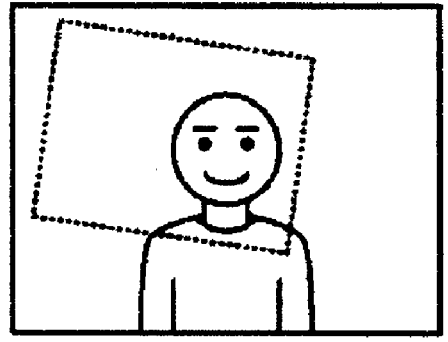

The secondary frame transforming data $C_2$ is then transmitted to a frame transforming data regularizing section 19 and is converted to the final frame transforming data C. The frame transforming data regularizing section 19 first checks whether $C_2$ is proper frame transforming data or not. The expression, "proper frame transforming data", refers to one having all of corrected frame coordinates based on $C_2$ included in the shot frame coordinates. For example, the frame transforming data in FIG. 20A is not proper while the frame transforming data as shown in FIG. 20B is proper.

More specifically, the points (0,0), (w,0), (0,h) and (w,h) of the four corners of a corrected frame rectangle are required to fit in the shot frame rectangle (0,0) to (W,H) after the transformation based on the frame transforming data $C_2$. In other words, if the condition:

$$\left. \begin{array}{l} \begin{pmatrix} 0 \\ 0 \\ 1 \end{pmatrix} \leq C_2 \begin{pmatrix} 0 \\ 0 \\ 1 \end{pmatrix} \leq \begin{pmatrix} W \\ H \\ 1 \end{pmatrix} \\ \begin{pmatrix} 0 \\ 0 \\ 1 \end{pmatrix} \leq C_2 \begin{pmatrix} w \\ 0 \\ 1 \end{pmatrix} \leq \begin{pmatrix} W \\ H \\ 1 \end{pmatrix} \\ \begin{pmatrix} 0 \\ 0 \\ 1 \end{pmatrix} \leq C_2 \begin{pmatrix} w \\ h \\ 1 \end{pmatrix} \leq \begin{pmatrix} W \\ H \\ 1 \end{pmatrix} \\ \begin{pmatrix} 0 \\ 0 \\ 1 \end{pmatrix} \leq C_2 \begin{pmatrix} 0 \\ h \\ 1 \end{pmatrix} \leq \begin{pmatrix} W \\ H \\ 1 \end{pmatrix} \end{array} \right\} \quad (20)$$

is all satisfied, $C_2$ is determined as being proper. If not, $C_2$ is determined as being not proper. If the data is determined as being proper, the frame transforming data regularizing section 19 directly outputs $C_2$ as output frame transforming data C.

On the other hand, if determined as being not proper, the minimum s (which is a value equal to or higher than 0) satisfying the equation below:

$$C = sC_0 + (1-s)C_2 \quad (21)$$

$$\left. \begin{array}{l} \begin{pmatrix} 0 \\ 0 \\ 1 \end{pmatrix} \leq C \begin{pmatrix} 0 \\ 0 \\ 1 \end{pmatrix} \leq \begin{pmatrix} W \\ H \\ 1 \end{pmatrix} \\ \begin{pmatrix} 0 \\ 0 \\ 1 \end{pmatrix} \leq C \begin{pmatrix} w \\ 0 \\ 1 \end{pmatrix} \leq \begin{pmatrix} W \\ H \\ 1 \end{pmatrix} \\ \begin{pmatrix} 0 \\ 0 \\ 1 \end{pmatrix} \leq C \begin{pmatrix} w \\ h \\ 1 \end{pmatrix} \leq \begin{pmatrix} W \\ H \\ 1 \end{pmatrix} \\ \begin{pmatrix} 0 \\ 0 \\ 1 \end{pmatrix} \leq C \begin{pmatrix} 0 \\ h \\ 1 \end{pmatrix} \leq \begin{pmatrix} W \\ H \\ 1 \end{pmatrix} \end{array} \right\}$$

is calculated, and the frame transforming data C is output by using the value of s.

Finally, the reference frame/frame transforming data update section 20 updates the reference frame $F_{base}$ and reference frame transforming data $C_{base}$ from the shot frame $F_{in}$ and frame transforming data C such that:

$$C_{base} = C \quad (22); \text{ and}$$

$$F_{base} = F \quad (22)$$

Here, the update is performed when one or a combination of:

Condition 1: The difference between $F_{base}$ and $F_{in}$ is equal to or larger than a threshold;

Condition 2: The difference between C and $C_0$ is equal to or larger than a threshold; and/or Condition 3: At certain intervals (such as every 15 shot frame)

is satisfied. The reason why $F_{base}$ and $C_{base}$ are not switched for each frame is it prevents slight movement or vibrations of a corrected frame even when no hand-movement occurs due to an error in movement detection when C is a value close to $C_0$ and when update is performed for each frame.

Condition 1 is for switching scenes and is provided because movement detection does not operate normally when a reference frame is not updated upon scene switching.

Condition 2 is provided since movement detection is difficult when the difference between C and $C_0$ is large.

According to this embodiment, since frame transforming data is generated by using the motion data calculation unit 35 according to the first embodiment, a highly accurate corrected frame is generated in real time.

Figure 21:
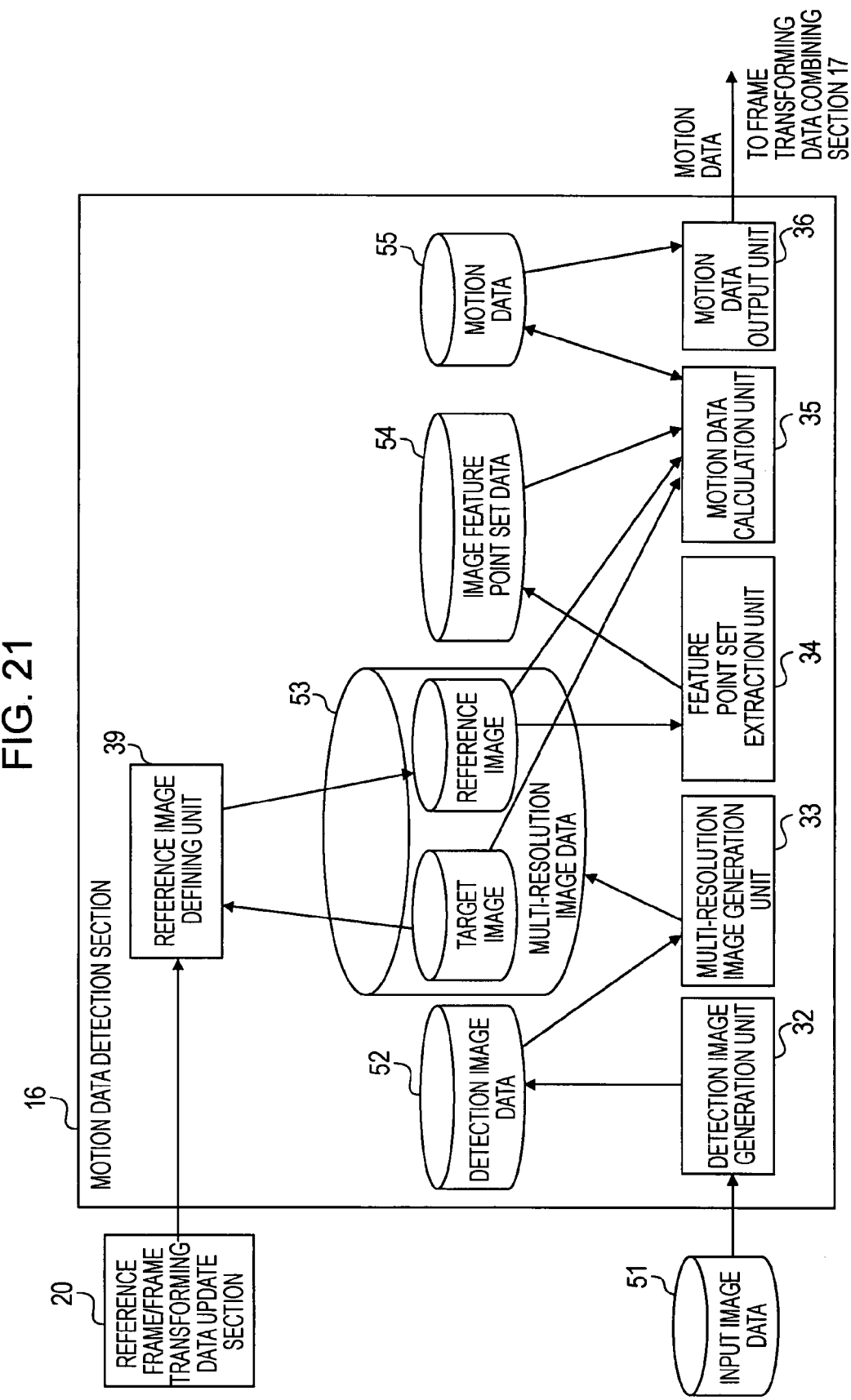
FIG. 21 is a block diagram according to another example of the motion data detection section in FIG. 1.

Since the switching of reference frames must be performed fast particularly in handling moving pictures, a reference image defining unit 39 may be provided in the motion data detection section 16 as shown in FIG. 21. The reference image defining unit 39 defines a reference image flag to the first input image. The units therein handle an image having the flag defined as a reference image and an image having the flag not defined as a target image. Then, when the reference frame/frame transforming data update section 20 outputs an instruction to update the reference frame, the reference image defining unit 39 defines the reference image flag to the current target image data. From the image which is image data having the reference image flag defined and which is to undergo the block matching, data such as feature point coordinates is detected by the feature point set extraction unit 34 and is stored in the image feature point set data storage unit 54. Then, the image is handled as a reference image in the subsequent processing. By feeding back and defining reference image information to multi-resolution image data based on an input image in this way, feature point set data can be extracted only from a required image (reference image), and the calculation of motion data from the other image (target image) can be performed in real time.

The present invention is not limited to the embodiments, and various changes may be made thereto. It is apparent that the methods and steps according to the embodiments can be protected as method for calculating motion data and/or programs for causing a computer to execute a motion data calculation process.

What is claimed is:

1. An image processing apparatus comprising:
   image data input means for inputting captured multiple images;
   detection image generation means for generating, based on the input images, smaller images by scaling down a certain area of the images;
   multi-resolution image data storage means for storing multi-resolution image data of the smaller images up to a predetermined resolution level such that each of them is identifiable between a reference image and a target image;
   feature point set extraction means for extracting one or more feature point coordinates based on an image corner or edge of the multi-resolution image data of the reference image; and
   motion data calculation means for calculating motion data between the reference image and the target image by using the multi-resolution image data,
   wherein the motion data calculating means has:

a whole-range matching section for performing, with regard to each of the reference images and target images from a lowest resolution L to a predetermined resolution M (M≦L), a matching process on all image coordinates in a predetermined range of the reference images and calculating motion data based on a first energy function whose arguments are the coordinates on the reference images and the target images; and a motion data calculating section for, with regard to image data of a resolution level higher than the predetermined resolution M, performing a block matching process based on a second energy function by setting input motion data as an initial value and handling the feature point coordinates on the reference images, which are extracted by the feature point set extraction means, as arguments thereof, and for calculating motion data between the reference images and target images by using reliability defined based on energy of the block matching process or strength of feature points and correlation defined based on motion data among the feature points of the reference images or coordinates based on the motion data; and motion data is calculated by a process, wherein the process comprises (a) calculating motion data for image data of a resolution M−1, which is a higher resolution than the resolution M, with using motion data for image data of the resolution M, which is calculated by the whole-range matching section, as initial value of motion data to be input to the motion data calculating section, (b) calculating motion data for image data of a much higher resolution with using the motion data as initial value information of motion data to be input to the motion data calculating section, and (c) repeating calculating the image data of higher resolution for predetermined number of times or until a predetermined condition is satisfied.

2. The image processing apparatus according to claim 1, wherein the motion data calculated by the motion data calculating section is an affine parameter.

3. An image processing apparatus comprising:
image data input means for inputting captured multiple images;
detection image generation means for generating, based on the input images, smaller images by scaling down a certain area of the images;
multi-resolution data generation means for calculating multi-resolution image data up to a predetermined resolution level based on images generated by the detection image generation means;
frame transforming data generation means having:
a motion data detection section for calculating motion data from a reference frame based on the reference frame and an input image;
a frame transforming data combining section for calculating a first frame transforming data based on the motion data and reference frame transforming data;
a frame transforming data standardization section for standardizing the first frame transforming data to calculate a second frame transforming data;
a frame transforming data regularizing section for determining whether a frame transformed by the second frame transforming data is within the captured frame or not and regularizing the second frame transforming data to make the frame transformed by the second frame transforming data fit within the captured frame; and
an update section for updating the reference frame and the reference frame transforming data by using the frame transforming data calculated by the frame transforming data regularizing section.

4. The image processing apparatus according to claim 3, further comprising:
synthesis means for determining whether coordinate points of four corners of a correction frame rectangle transformed by the frame transforming data are within a captured frame rectangle or not, calculating an optimum frame transforming data to fit the correction frame rectangle within the captured frame rectangle when any of the coordinate points thereof is outside of the captured frame rectangle, and synthesizing the correction frame.

* * * * *